(12) United States Patent
Atobe et al.

(10) Patent No.: US 7,605,939 B2
(45) Date of Patent: Oct. 20, 2009

(54) INFORMATION PROCESSING APPARATUS FOR FORMING RASTER IMAGE DATA BASED ON DIFFERENT PRINTING COMMANDS, CONTROL METHOD THEREFOR, AND COMPUTER-READABLE MEDIUM STORING A COMPUTER PROGRAM IMPLEMENTING THE CONTROL THEREOF

(75) Inventors: Hiroshi Atobe, Richmond (GB); Masahiro Takayanagi, Takasaki (JP)

(73) Assignee: Canon Kabushiki Kaisha (JP)

( * ) Notice: Subject to any disclaimer, the term of this patent is extended or adjusted under 35 U.S.C. 154(b) by 978 days.

(21) Appl. No.: 10/965,282

(22) Filed: Oct. 14, 2004

(65) Prior Publication Data
US 2005/0117178 A1 Jun. 2, 2005

(30) Foreign Application Priority Data
Oct. 14, 2003 (JP) ............................. 2003-353738

(51) Int. Cl.
G06K 15/00 (2006.01)
G06K 15/02 (2006.01)
G06F 3/12 (2006.01)

(52) U.S. Cl. ..................... 358/1.16; 358/1.15; 358/1.2; 358/1.9

(58) Field of Classification Search ................ 358/1.17, 358/1.15, 1.18, 448, 1.9, 1.2; 399/82; 700/105
See application file for complete search history.

(56) References Cited

U.S. PATENT DOCUMENTS 6,373,585 B1 * 4/2002 Mastie et al. .............. 358/1.15

FOREIGN PATENT DOCUMENTS

| JP | 06-91990 A | 4/1994 |
| JP | 2000-168165 A | 6/2000 |
| JP | 2002251272 A | 9/2002 |
| JP | 2003-6133 A | 1/2003 |
| JP | 2003015846 A | 1/2003 |
| JP | 2003-44253 A | 2/2003 |

* cited by examiner

Primary Examiner—Edward L Coles
Assistant Examiner—Thomas J Lett
(74) Attorney, Agent, or Firm—Rossi, Kimms & McDowell, LLP (57) ABSTRACT

An information processing apparatus is communicable with a server and an image forming apparatus. A first set of printing commands is acquired from the server. A raster image processor (RIP) processes an image to form raster image data based on the acquired first set of printing commands. One of the first set of printing commands or the formed raster image data is transferred to the image forming apparatus. The RIP is controlled to form raster image data based on a second set of printing commands when the RIP is not carrying out image processing based on the first set of printing commands, and the second set of printing commands are transferred to the image forming apparatus for image processing based thereon when the RIP is carrying out image processing based on the first set of printing commands.

7 Claims, 10 Drawing Sheets

INFORMATION PROCESSING APPARATUS FOR FORMING RASTER IMAGE DATA BASED ON DIFFERENT PRINTING COMMANDS, CONTROL METHOD THEREFOR, AND COMPUTER-READABLE MEDIUM STORING A COMPUTER PROGRAM IMPLEMENTING THE CONTROL THEREOF

BACKGROUND OF THE INVENTION

1. Field of the Invention

The present invention relates to an information processing apparatus that communicates with an image forming apparatus such as a multi-function printer having a number of functions, including a print function, a copy function, and a facsimile function, and an external information processing apparatus, and a control method for controlling the information processing apparatus, and a control program for implementing the control method.

2. Description of the Related Art

Conventionally, a multi-function printer, which is an image forming apparatus having a number of functions, such as a print function, a copy function, a facsimile function, and a scan function, includes a type that has incorporated therein a raster image processor (RIP) which expands information generated by application software stored in an external information processing apparatus into bitmap image data, and a type in which the raster image processor is installed in an external information processing apparatus such as a server externally connected to the multi-function printer (refer to Japanese Laid-Open Patent Publication (Kokai) No. 2003-044253, for example).

The type with the raster image processor incorporated therein (first type) and the type with the raster image processor installed in an external information processing apparatus (second type) have respective merits.

Specifically, in the first type, the entire cost is low and the space for accommodating the apparatuses is small. In the second type, there is high freedom of selection and design of the hardware, making it possible to increase the capability of the raster image processor.

There is known a technique that, when a client issues a query using a device management protocol called UPNP (Universal Plug and Play) to a printer conforming to a device management protocol called SNMP (Simple Network Management Protocol), a server connected between the printer and the client carries out protocol conversion (refer to, Japanese Laid-Open Patent Publication (Kokai) No. 2003-006133, for example).

However, in the second type, different communication protocols are used by the multi-function printer and the external information processing apparatus, which raises a problem that the communication between the multi-function printer and the external information processing apparatus cannot be carried out.

In particular, when the multi-function printer and the external information processing apparatus are designed and manufactured by different manufacturers, this problem occurs frequently.

Moreover, there is a problem that the versions of communication protocols used by the multi-function printer and the external information processing apparatus are different from each other since these apparatuses were designed at different times. Furthermore, the communication between the multi-function printer and the external information processing apparatus is carried out by using communication protocols conforming to a variety of user software (utility software) used by these apparatuses, and thus different protocols have to be used between the apparatuses.

Further, in the case where an external apparatus is connected to a multi-function printer for communication therebetween, irrespective of a location at which the raster image processor is installed, protocols used by these apparatuses do not always match.

It is possible to install raster image processors in an external apparatus such as a server and a multi-function printer. However, it is difficult to determine which raster image processor should be used to improve the performance of the entire image processing system.

SUMMARY OF THE INVENTION

It is a first object of the present invention to provide an information processing apparatus, a control method for controlling the apparatus, and a control program for implementing the control method, which are capable of efficiently carrying out image processing and hence improving the performance of the whole of an image processing system with the information processing apparatus included therein.

It is a second object of the present invention to provide an information processing apparatus, a control method for controlling the apparatus, and a control program for implementing the control method, which are enable communication between an image forming apparatus and an external information processing apparatus to be carried out even when the image forming apparatus and the external information processing apparatus use different communication protocols.

To attain the first object, in a first aspect of the present invention, there is provided an information processing apparatus that communicates with an external information processing apparatus and an image forming apparatus via a predetermined communication medium, comprising an acquisition device that acquires a first set of printing commands from the external information processing apparatus, an image processing device that carries out image processing to form raster image data based on the first set of printing commands acquired by the acquisition device, a transfer device that transfers one of the first set of printing commands and the raster image data formed by the image processing device to the image forming apparatus, a determining device that determines whether or not the image processing device is carrying out image processing based on the first set of printing commands when the acquisition device acquires a second set of printing commands after acquiring the first set of printing commands, and a controller that controls the image processing device to form raster image data based on the second set of printing commands when the determining device determines that the image processing device is not carrying out image processing based on the first set of printing commands, and controls the transfer device to transfer the second set of printing commands to the image forming apparatus for image processing based thereon when the determining device determines that the image processing device is carrying out image processing based on the first set of printing commands.

According to the first aspect of the present invention, the image processing device is controlled to form raster image data based on the second set of printing commands when the determining device determines that the image processing device is not carrying out image processing based on the first set of printing commands, and the transfer device is controlled to transfer the second set of printing commands to the image forming apparatus for image processing based thereon when the determining device determines that the image processing device is carrying out image processing based on the first set of printing commands. As a result, when a plurality of sets of printing commands are inputted from an external image processing device, the information processing apparatus is capable of efficiently carrying out image processing and hence improving the performance of the whole of an image processing system with the information processing apparatus included therein.

Preferably, the acquisition device acquires the first and second sets of printing commands from the external information processing apparatus, using a first communication protocol, and the transfer device transfers the first and second sets of printing commands or raster image data formed based on the first and second sets of printing commands to the image forming apparatus, using a second communication protocol.

With this construction, the first communication protocol is used for communicating between the acquisition device and the external information processing apparatus, and the second communication protocol is used for communicating between the transfer device and the image forming apparatus. As a result, communication between the image forming apparatus and the external information processing apparatus can be carried out even when the image forming apparatus and the external information processing apparatus use different communication protocols.

Preferably, the image forming apparatus has a first central control device that controls an image processing function thereof, the information processing apparatus further comprises a second central control device that controls functioning of the image processing device, and a determining device that determines whether to carry out image processing based on the first and second sets of printing commands by the image forming apparatus or the image processing device, according to a difference between performances of the first central control device and the second control device.

Preferably, the acquisition device has a first network interface that acquires the first and second sets of printing commands from the external information processing apparatus, and the transfer device has a second network interface and a high speed video interface that transfer the first and second sets of printing commands or raster image data formed based on the first and second sets of printing commands to the image forming apparatus.

To attain the first object, in a second aspect of the present invention, there is provided a control method of controlling an information processing apparatus that communicates with an external information processing apparatus and an image forming apparatus via a predetermined communication medium, comprising an acquisition step of acquiring a first set of printing commands from the external information processing apparatus, an image processing step of carrying out image processing to form raster image data based on the first set of printing commands acquired in the acquisition step, a transfer step of transferring one of the first set of printing commands and the raster image data formed in the image processing step to the image forming apparatus, a determining step of determining whether or not the image processing step is carrying out image processing based on the first set of printing commands when the acquisition step acquires a second set of printing commands after acquiring the first set of printing commands, and a control step of controlling the image processing step to form raster image data based on the second set of printing commands when the determining step determines that the image processing step is not carrying out image processing based on the first set of printing commands, and controlling the transfer step to transfer the second set of printing commands to the image forming apparatus for image processing based thereon when the determining step determines that the image processing step is carrying out image processing based on the first set of printing commands.

According to the second aspect of the present invention, the same effects can be provided as in the first aspect of the present invention.

Preferably, the information processing apparatus has a first communication protocol and a second communication protocol, the acquisition step acquires the first and second sets of printing commands from the external information processing apparatus, using the first communication protocol, and the transfer step transfers the first and second sets of printing commands or raster image data formed based on the first and second sets of printing commands to the image forming apparatus, using the second communication protocol.

Preferably, the image forming apparatus has a first central control device that controls an image processing function thereof, the information processing apparatus comprises a second central control device that controls functioning of the image processing step, the control method further comprises a determining step of determining whether to carry out image processing based on the first and second sets of printing commands by the image forming apparatus or in the image processing step, according to a difference between performances of the first central control device and the second control device.

Preferably, the acquisition step acquires the first and second sets of printing commands from the external information processing apparatus, using a first network interface, and the transfer step transfers the first and second sets of printing commands or raster image data formed based on the first and second sets of printing commands to the image forming apparatus, using a second network interface or a high speed video interface.

To attain the first object, in a third aspect of the present invention, there is provided a control program executed by an information processing apparatus that communicates with an external information processing apparatus and an image forming apparatus via a predetermined communication medium, comprising an acquisition module for acquiring a first set of printing commands from the external information processing apparatus, an image processing module for carrying out image processing to form raster image data based on the first set of printing commands acquired by the acquisition module, a transfer module for transferring one of the first set of printing commands and the raster image data formed by the image processing module to the image forming apparatus, a determining module for determining whether or not the image processing module is carrying out image processing on the first set of printing commands when the acquisition module acquires a second set of printing commands after acquiring the first set of printing commands, and a control module for controlling the image processing module to form raster image data based on the second set of printing commands when the determining module determines that the image processing module is not carrying out image processing based on the first set of printing commands, and controlling the transfer module to transfer the second set of printing commands to the image forming apparatus for image processing based thereon when the determining module determines that the image processing module is carrying out image processing based on the first set of printing commands.

According to the third aspect of the present invention, the same effects can be provided as in the first aspect of the present invention.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing preferred embodiments thereof. In the drawings, elements and parts which are identical throughout the views are designated by like reference numeral, and duplicate description thereof is omitted.

Figure 1:
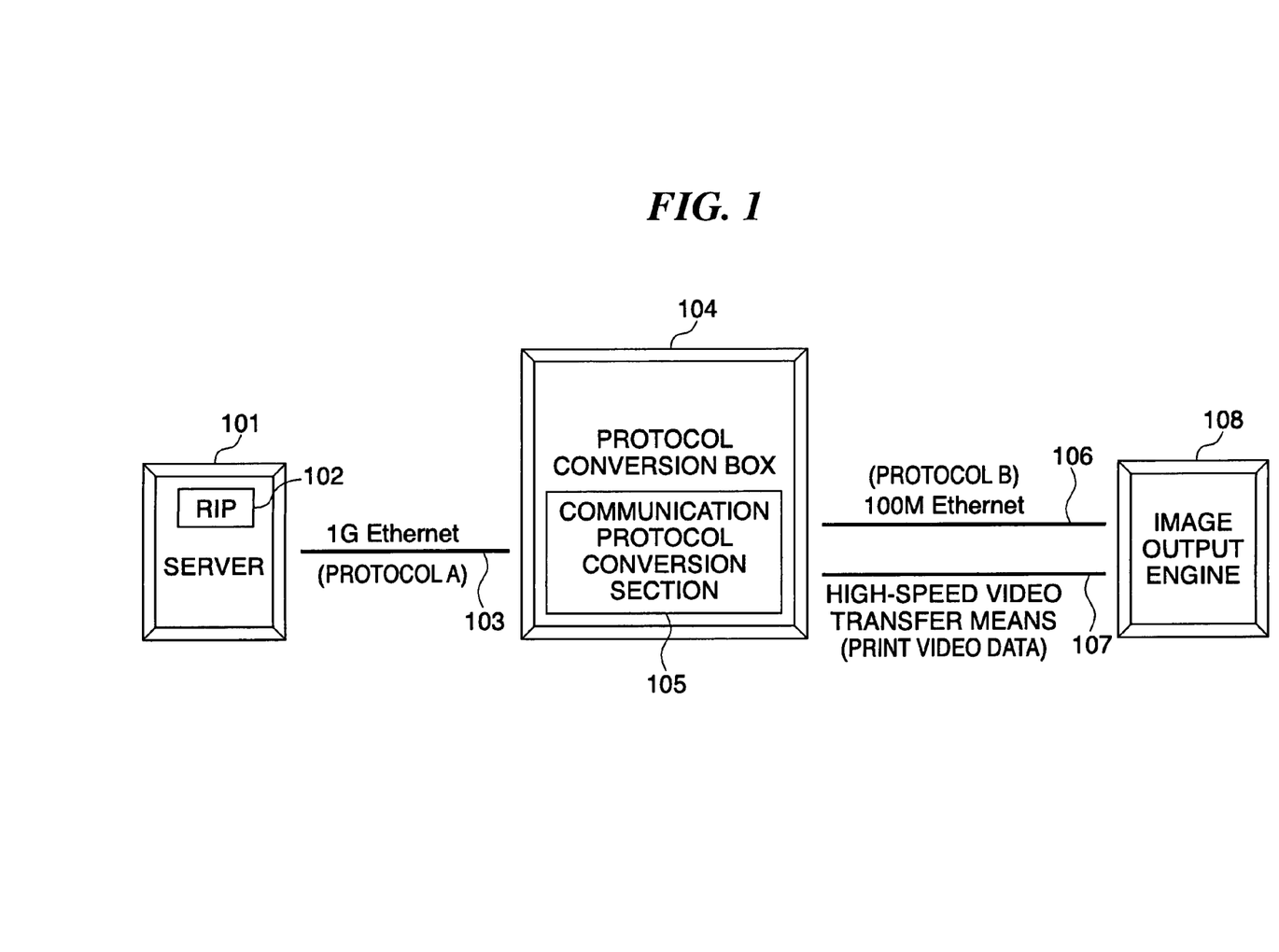
FIG. 1 is a diagram showing the arrangement of an image processing system including an information processing apparatus according to a first embodiment of the present invention, in particular, when a raster image processor (RIP) is installed in a server.
Figure 2:
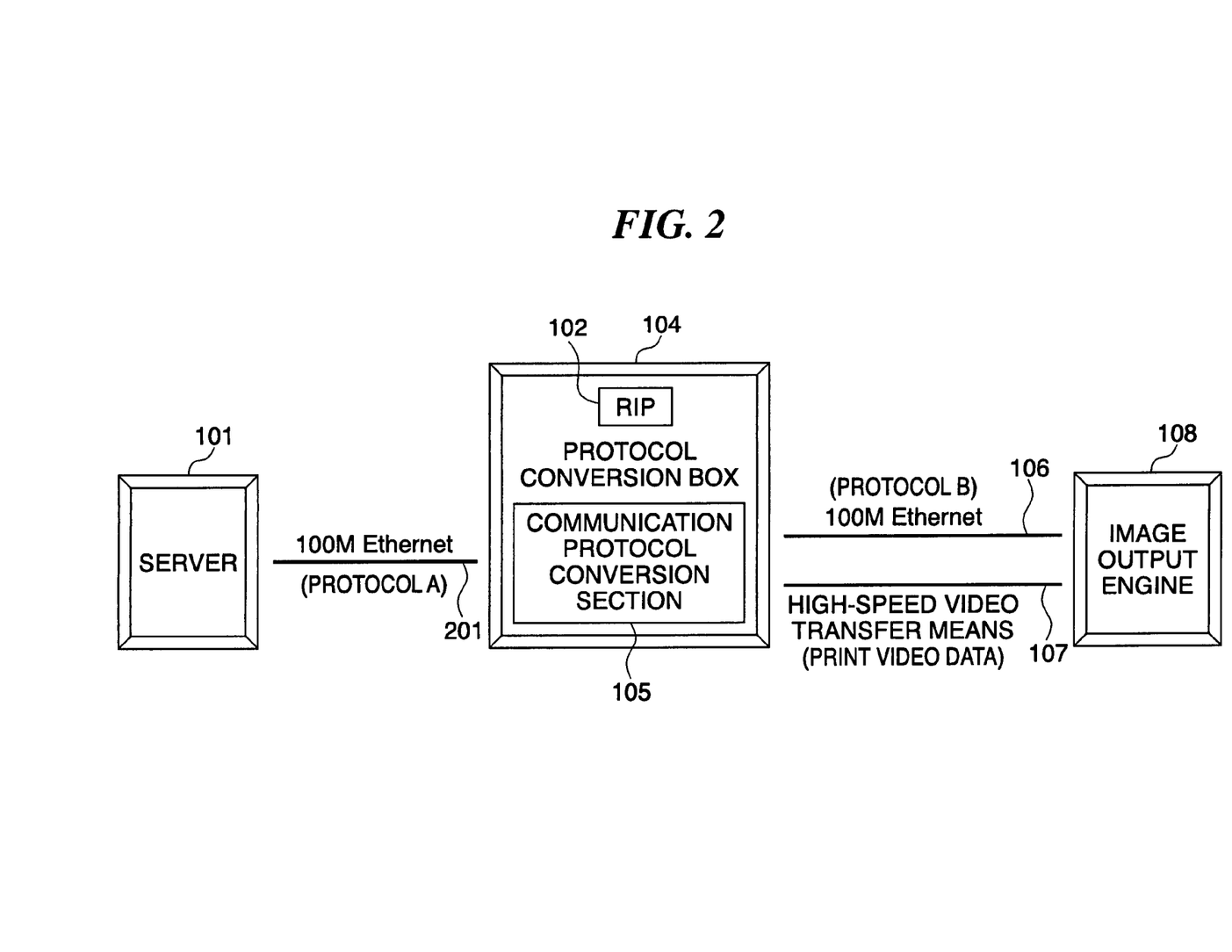
FIG. 2 is a diagram showing the arrangement of the image processing system when the RIP in FIG. 1 is installed in a protocol conversion box.
Figure 3:
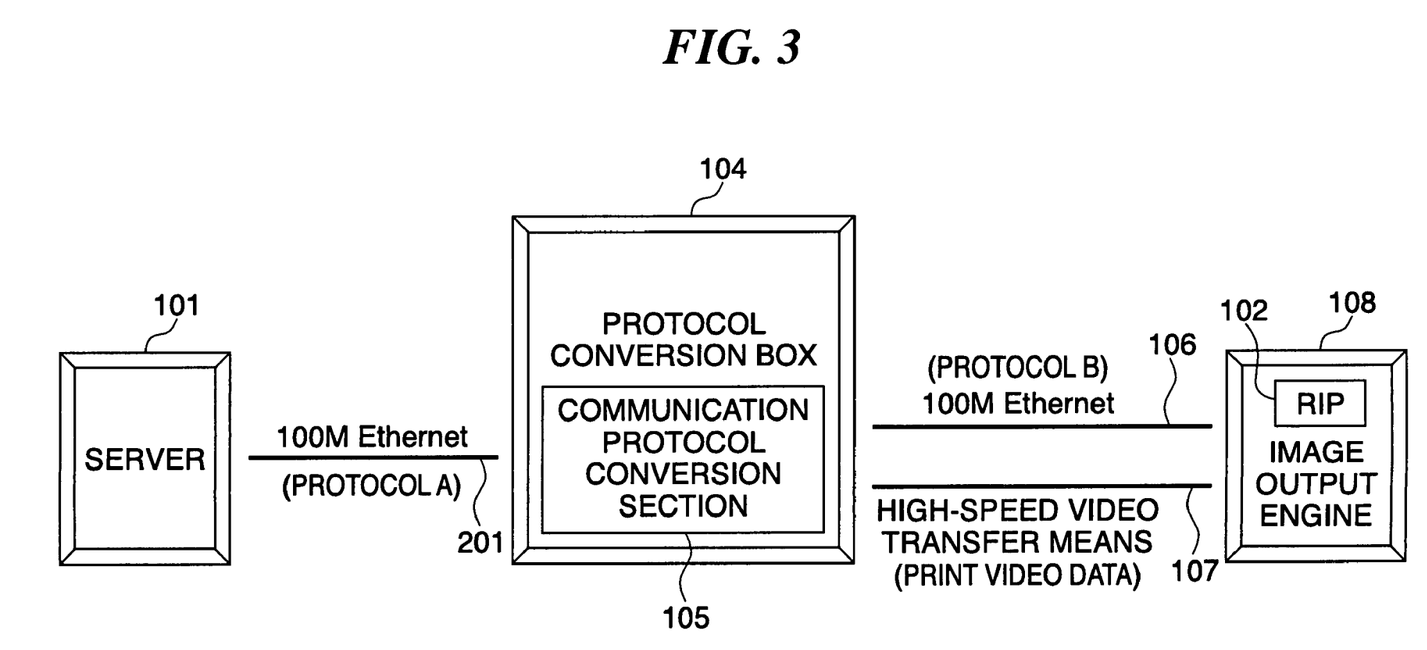
FIG. 3 is a diagram showing the arrangement of the image processing system when the RIP in FIG. 1 is installed in an image output engine.

FIGS. 1 to 3 are diagrams showing the arrangement of an information processing system including an information processing apparatus according to a first embodiment of the present invention. This information processing system processes image information or the like.

In FIG. 1, reference numeral 101 designates a server as an external information processing apparatus, which is externally connected to an image output engine 108 as an image forming apparatus, described hereinafter. The external information processing apparatus is not limited to the server, and may be another information processing apparatus, such as a printer, a copier, a facsimile, and an information reading apparatus (scanner), or a multi-function apparatus having many functions such as a print function, a copy function, a facsimile function and an information reading function.

Reference numeral 102 designates a raster image processor (hereinafter referred to as "the RIP"), which expands an image generated by application software in the server 101 into bitmap image data. The process for converting an image into bitmap image data will be hereinafter referred to as RIP processing. The RIP processing is included in image processing.

Reference numeral 103 designates an Ethernet (registered trademark) as a communication means, having a data transfer speed of 1 Gbps, and transfers bitmap image data generated by the RIP 102 to a protocol conversion box 104, described hereinafter.

Reference numeral 104 designates the protocol conversion box as an information processing apparatus, and the protocol conversion box 104 has a communication protocol conversion section 105. The communication protocol conversion section 105 is implemented by a protocol conversion circuit or a protocol conversion program.

The protocol conversion box 104 performs communication with the server 101 using a communication protocol A and performs communication with the image output engine 108 using a communication protocol B. Specifically, when the protocol conversion box 104 communicates with the image output engine 108, the communication protocol conversion section 105 provided in the protocol conversion box 104 converts a communication protocol to be used from the communication protocol A to the communication protocol B. Reference numeral 106 designates an Ethernet having a data transfer speed of 100 Mbps, which transfers information such as a command or a status to the image output engine 108 using the communication protocol B.

Reference numeral 107 designates a high-speed video transfer means which transfers video data (information) for print use to the image output engine 108 at high speed. The high-speed video transfer means 107 is used to output data, which has undergone RIP processing by the server 101 or the protocol conversion box 104, to the image output engine 108 as raw data (data that has not been compressed) The high-speed video transfer means 107 can be realized by a channel link, for example, details of which will be described later with reference to FIG. 6.

Reference numeral 108 designates the image output engine as an image forming apparatus, which outputs color images and monochrome images as information, using an electrophotographic technique.

The image output engine 108 may be a printer, a copier, a facsimile, an information reading device (scanner), a server, or a multi-functional apparatus having various functions such as a print function, a copy function, a facsimile function, and an information reading function.

FIG. 1 shows a case where the RIP 102 is installed in the server 101. However, the RIP 102 may be installed in the protocol conversion box 104 or in the image output engine 108.

FIG. 2 shows a case where the RIP 102 in FIG. 1 is installed in the protocol conversion box 104. In this case, image data generated by the application software in the server 101 is outputted from the server 101 in accordance with a selected one of a variety of PDL (page description language) data. The generated image data does not have a large data volume unlike bitmap image data, and hence in comparison with the arrangement of the system in FIG. 1, a high transfer speed is not required to transfer the image data. Therefore, an Ethernet 201 between the server 101 and the protocol conversion box 104 has only to have a data transfer speed of 100 Mbps. The communication protocol conversion section 105 causes the RIP 102 to carry out RIP processing on a data stream or PDL data received from the server 101 according to the communication protocol A, converts the communication protocol to be used from the communication protocol A to the communication protocol B, and outputs the RIP processed data to the image output engine 108 according to the communication protocol B.

FIG. 3 shows a case where the RIP 102 is installed in the image output engine 108. In this case, image data generated by the application software in the server 101 is outputted from the server 101 in a data format of a data stream called IPDS (Intelligent Printer Data Stream), PDL data such as PostScript or PCL, or the like, and the protocol conversion box 104 converts only the communication protocol to be used from the communication protocol A to the communication protocol B without converting the data format, and outputs the image data from the server 101 to the image output engine 108. In this case, the Ethernet 201 between the server 101 and the protocol conversion box 104 has only to have a data transfer speed of 100 Mbps, as is the same with the case of FIG. 2.

In FIGS. 1 to 3, the server 101, the protocol conversion box 104, and the image output engine 108 are implemented by respective independent hardware.

Figure 4:
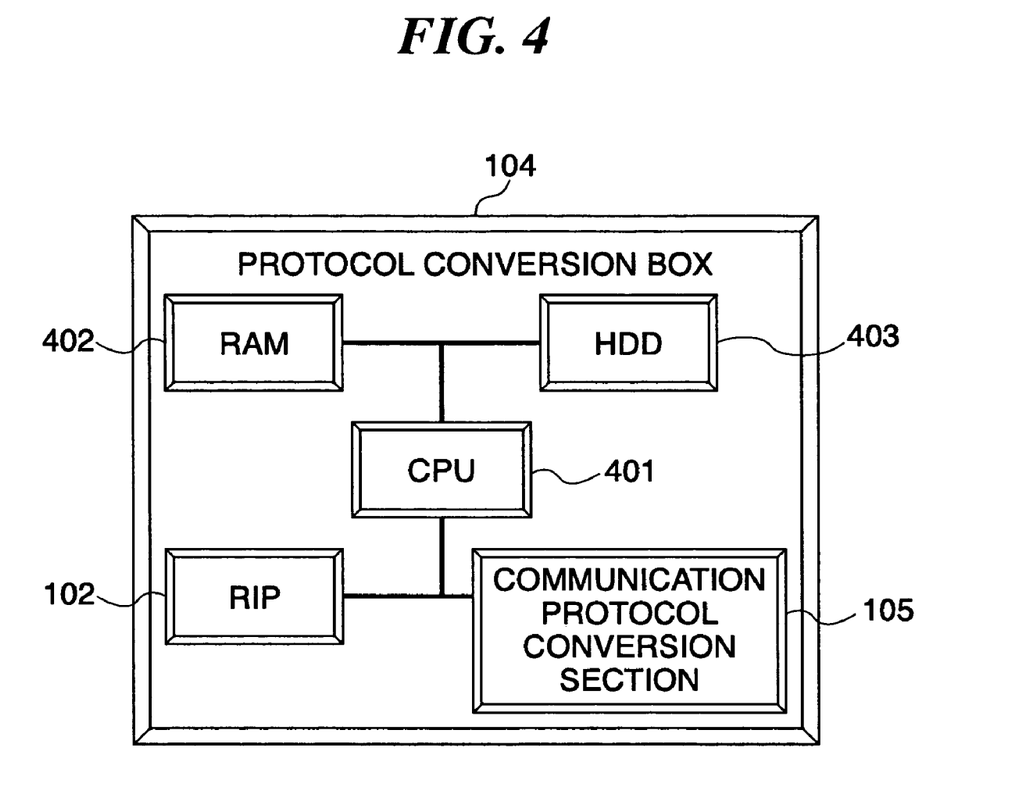
FIG. 4 is a diagram showing the internal construction of the protocol conversion box in FIG. 2.

FIG. 4 is a diagram showing the internal construction of the protocol conversion box 104, in which the RIP 102 is installed in the protocol conversion box 104, as shown in FIG. 2.

In FIG. 4, reference numeral 401 designates a CPU (central processing unit) which controls the protocol conversion box 104 as a whole, and controls a RAM (random access memory) 402 or a HDD (hard disk drive) 403. The server 101 and the image output engine 108 carry out communication with each other using respective different protocols. The communication protocol conversion section 105 serves to enable communication between the apparatuses which use such different protocols, and includes a function for absorbing a difference in communication timing caused by the use of such different protocols.

Figure 5:
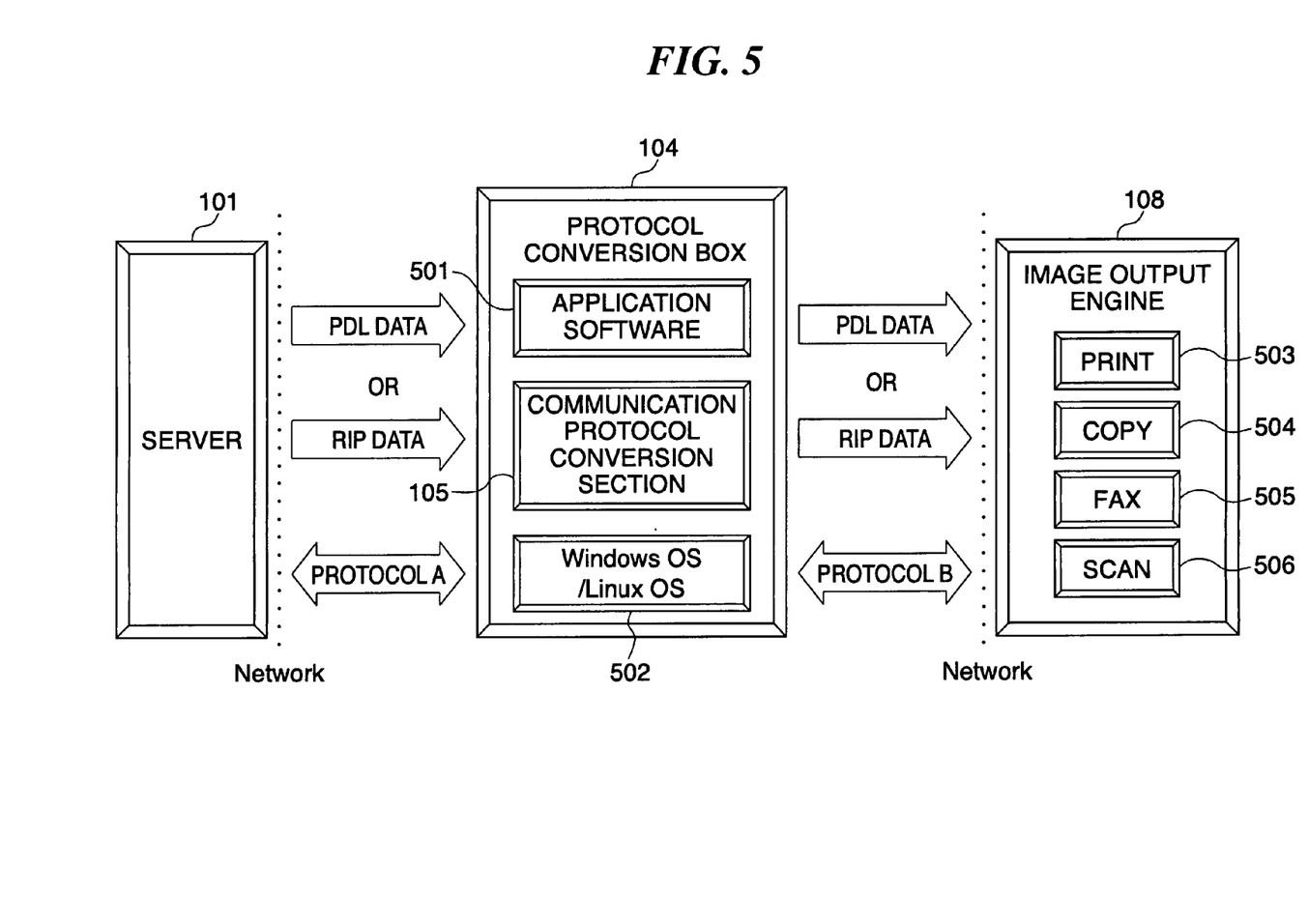
FIG. 5 is a diagram showing an example of a manner of communication between the server, the protocol conversion box, and the image output engine in FIG. 1.

FIG. 5 is a diagram showing an example of a manner of communication between the server 101, the protocol conversion box 104, and the image output engine 108.

As shown in FIG. 5, the server 101 receives data to be recorded or printed (recording data) created by application software of a PC (personal computer) or a workstation, neither of which is shown. The recording data is, for example, a data stream such as IPDS (Intelligent Printer Data Stream), PDL data such as PostScript or PCL, or the like (in FIG. 5, the recording data is shown as PDL data or RIP data).

The recording data is outputted to the protocol conversion box 104 according to the communication protocol A. The protocol conversion box 104 has installed therein a Windows (registered trademark) OS or Linux OS 502 as an operating system, and application software 501 and the communication protocol conversion section 105 operate on the Windows OS or Linux OS 502.

The application software 501 is, for example, word processing software or diagram drawing software. Alternatively, the application software 501 may be software having a function for outputting PDL data inputted from the server 101 as it is. Furthermore, the application 501 may be RIP software having a function for outputting PDL data (RIP data) after expanding the same into bitmap image data.

RIP data generated by such application software 501 or PDL data inputted from the server 101 and outputted as it is outputted to the image output engine 108 using the communication protocol B converted from the communication protocol A by the protocol conversion section 105.

The terms "communication protocol A" and "communication protocol B" are only used only for the sake of simplification of the explanation, and any type of protocol may be used.

The PDL data or the RIP data inputted to the image output engine 108 are printed and outputted using a print function 503 and sent by fax using a facsimile (FAX) function 505. Apart from the print function 503 and the FAX function 505, the image output engine 108 has various other functions, for example, is a multi-function printer having a copy function 504, and a scan function 506.

The communication between the server 101 and the protocol conversion box 104 is realized by a network connection using the 1G Ethernet (registered trademark) 103 or the 100M Ethernet (registered trademark) 201. The communication between the protocol conversion box 104 and the image output engine 108 is realized by a combination of a network connection using the 100M Ethernet (registered trademark) 106 and a connection by the high speed video transfer means 107. The server 101, the protocol conversion box 104, and the image output engine 108 have IP (internet protocol) addresses as respective different identifiers for example.

Next, the specific structure of the high-speed video transfer means 107 will be explained using FIG. 6.

Figure 6:
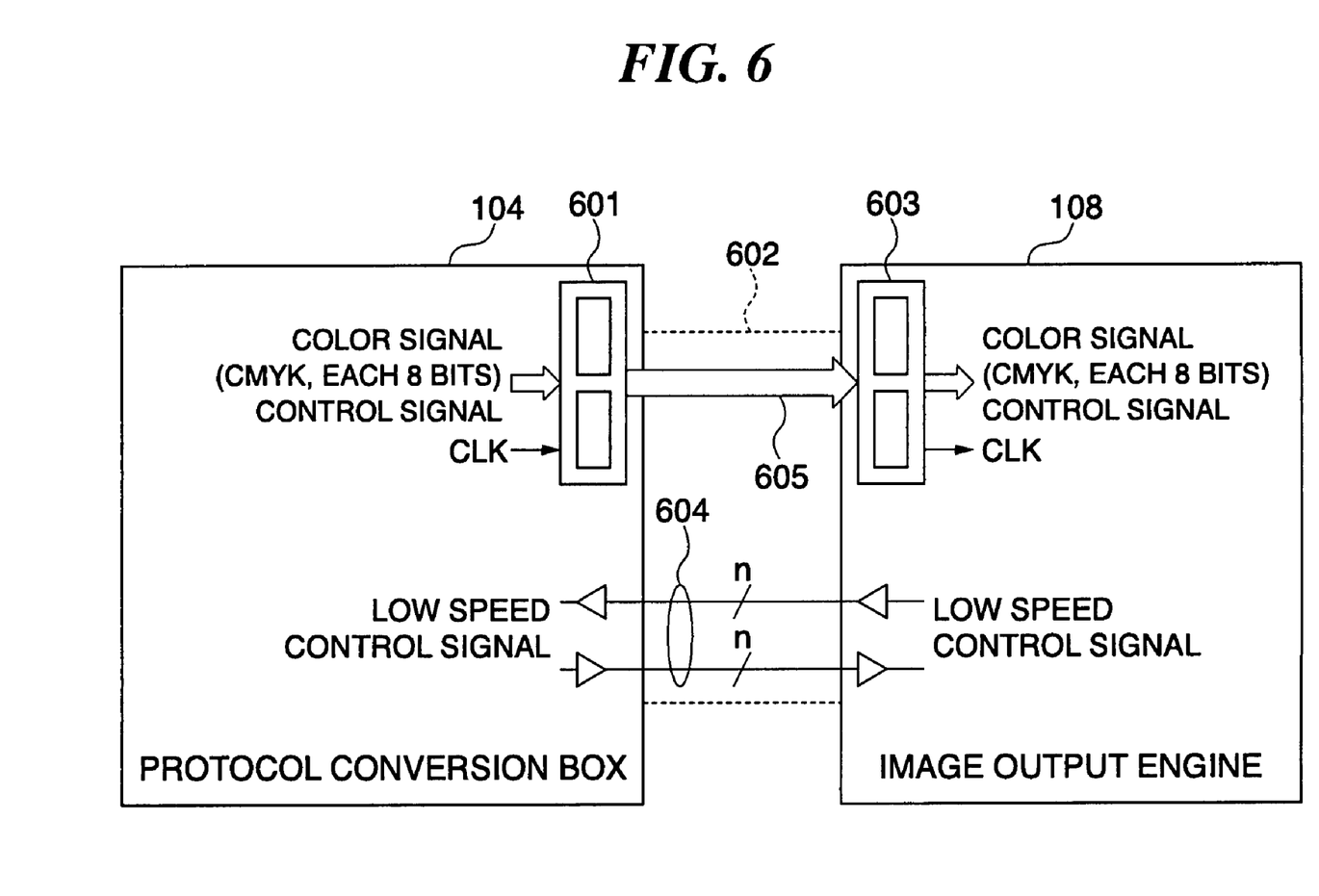
FIG. 6 is a diagram useful in explaining the specific construction of a high-speed video transfer means.

FIG. 6 is a diagram useful in explaining the specific construction of the high-speed video transfer means 107. In FIG. 6, reference numeral 104 designates the protocol conversion box, and reference numeral 601 designates two transmitting channel link means which are provided in the protocol conversion box 104. Reference numeral 602 designates a connection cable which connects the protocol conversion box 104 and the image output engine 108, and reference numeral 603 designates two receiving channel link means which are provided in the image output engine 108. Reference numeral 604 designates a low speed control signal transfer line (low-speed information transfer signal line), and reference numeral 605 designates a high-speed information transfer signal line. The low speed control signal transfer line 604 and the high-speed information transfer signal line 605 are housed in one connection cable 602.

In actual operation, the protocol conversion box 104 sends color signals (CMYK, each 8 bits) and control signals therefor to the image output engine 108 via the transmitting channel link means 601 and the connection cable 602 which can transfer those signals at high speed. The image output engine 108 receives the color signals and the control signals from the protocol conversion box 104 by the two receiving channel link means 106. Printing (output) is carried out based on the received color signals and control signals.

Communications between the protocol conversion box 104 and the image output engine 108 include not only the above description communication carried out at high speed via the transmitting channel link means 601 and the receiving channel link means 603, but also signal transfer carried out at low speed via the low speed control signal transfer line 604 in FIG. 6. Specifically, a PRDY signal indicative of activation of the image output engine 108 is transferred from the image output engine 108 to the protocol conversion box 104 via the low speed control signal transfer line 604. On the other hand, a CRDY signal indicative of activation of the protocol conversion box 104 is transferred from the protocol conversion box 104 to the image output engine 108 via the low speed control signal transfer line 604.

In the present embodiment, as described above, two channel link means 203 having a 28-bit width are arranged in parallel to receive 8-bit CMYK data to be processed by the image output engine 108. However, for an image output engine that requires a wider bit width (for example, CMYK each 12 bits), it is possible to increase the number of the channel link means 603 to be arranged in parallel to not less than 4, for example. Moreover, for a higher speed image output engine as well, the number of the channel link means 603 may be increased.

As the data transferring method of the transmitting and receiving channel link means 601 and 603, the high speed parallel/serial transforming data method is used. For example, when 32-bit data are transferred in parallel using a 66 MHz clock, a transfer speed of 2.2 Gbps can be achieved.

On the other hand, general-purpose transfer means which do not have a high transfer speed include the 100M Ethernet and the 1G Ethernet. The 1G Ethernet has an effective transfer speed of approximately 500 Mbps. For a high-speed image output engine, the channel link means are separately provided as high-speed interfaces (I/Fs). As the image output engine 108, a type that can separately send additional information such as TAG bits in addition to color data such as CMYK data may be used. From these facts, it is significant that the interfaces (I/Fs) between the protocol conversion box 104 and the image output engine are adapted for high-speed data transfer.

A description will now be given of a process carried out by the information processing system including the information processing apparatus according to the present embodiment with reference to FIGS. 5 and 7.

In FIG. 5, the RIP 102 can exist in any of the server 101, the protocol conversion box 104, and the image output engine 108. Also, in the present embodiment, no matter where the RIP 102 exists, conversion control of the communication protocol can be carried out by the communication protocol conversion section 105 in a manner corresponding to the place where the RIP 102 exists.

Figure 7:
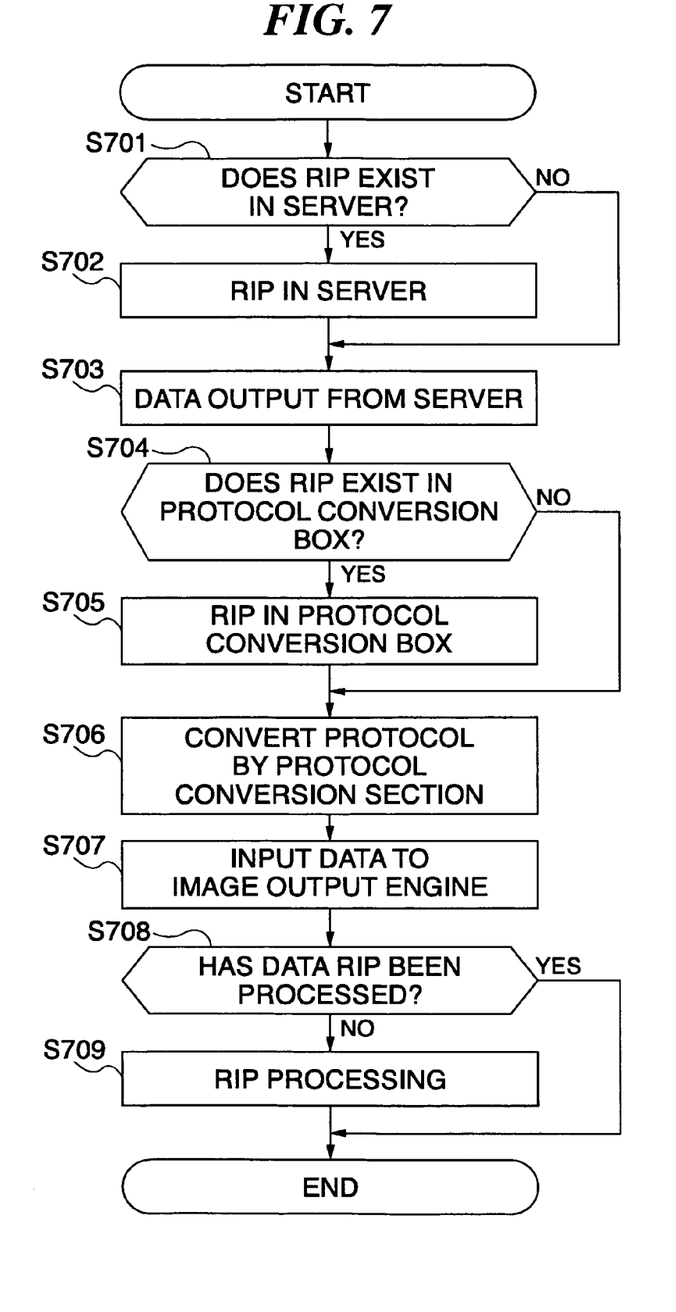
FIG. 7 is a flowchart showing a process carried out by the information processing system in FIG. 1.

FIG. 7 is a flowchart showing a flow of a process carried out by the information processing system including the information processing apparatus according to the present embodiment.

First, in a step S701, the communication protocol conversion section 105 determines whether or not the RIP 102 exists in the server 101. If it is determined that the RIP 102 exists in the server 102 (YES), the process proceeds to a step S702 where the protocol conversion box 104 sends an instruction to carry out RIP processing on data to be printed (printing data: PDL data) to the server 101 by the server 101. After the server 101 has carried out RIP processing on the PDL data according to the instruction from the protocol conversion box 104, then the process proceeds to the next step S703.

On the other hand, if it is determined in the step S701 that the RIP 102 does not exist in the server 102 (NO), the a step S702 is skipped and the process proceeds to the step S703.

In the step S703, the printing data is outputted from the server 101. Then, in a step S704, the communication protocol conversion section 105 determines whether or not the RIP 102 exists in the protocol conversion box 104. If it is determined that the RIP 102 exists in the protocol conversion box 104 (YES) and also if the printing data is PDL data, in a step S705, the communication protocol conversion section 105 sends an instruction to carry out RIP processing on the PDL data by the protocol conversion box 104 to the protocol conversion box 104. After the protocol conversion box 104 has carried out RIP processing on the PDL data according to the instruction of the communication protocol conversion section 105, then the process proceeds to a step S706.

On the other hand, if it is determined in the step S704 that the RIP 102 does not exist in the protocol conversion box 104 (NO), the step S705 is skipped and the process proceeds to the step S706.

In the step S706, regardless of whether the printing data is PDL data or RIP data, the communication protocol conversion section 105 converts the communication protocol to be used from the communication protocol A to the communication protocol B. Next, in a step S707, the communication protocol conversion section 105 outputs the printing data as it is to the image output engine 108 (that is, the printing data is inputted to the image output engine 108).

Then, in a step S708, the image output engine 108 determines whether or not RIP processing has been carried out on the printing data inputted from the communication protocol conversion section 105. If it is determined that no RIP processing has been carried out on the printing data inputted from the communication protocol conversion section 105 (NO), the process proceeds to a step S709 where the protocol conversion box 104 carries out RIP processing on the printing data. After the image is outputted, followed by the process being terminated.

On the other hand, in the step S708, if it is determined that RIP processing has already been carried out on the inputted data (YES), the step S709 is skipped. In other words, RIP processing is not carried out on the printing data, and then the image is outputted, followed by the process being terminated.

As described above, according to the present embodiment, the communication protocol conversion section 105 is provided, which converts the communication protocol for the data outputted from the server 101 to the communication protocol that the image output engine 108. As a result, the communication between the image output engine 108 and the server 101 can be carried out even when the image output engine 108 and the server 101 have respective different communication protocols.

Further, since the server 101 and the image output engine are made of separate hardware, the development of the server 101 and the image output engine 108 can each be carried out independently and sold separately. For example, by mounting the high-speed video transfer means 107 to the protocol conversion box 104, it is not necessary to mount the high-speed video transfer means 107 to the server 101, which makes it unnecessary to carry out development of a high-speed video transfer means as hardware for the server 101, and hence it is possible to concentrate only on development of software on the server side. Further, by connecting the protocol conversion box 104 between the server 101 and the image output engine 108, the server 101 provided with any software can be connected to the image output engine 108 by a universal interface such as Ethernet (registered trademark).

Moreover, since the protocol conversion box 104 and the image output engine 108 is connected by the inexpensive high-speed video transfer means 107, a high throughput of the image output engine 108 can be obtained with an inexpensive construction.

Moreover, the server 101 and the communication protocol conversion section 105, and the communication protocol conversion section 105 and the image output engine 108 are connected via respective Ethernet (registered trademark) 103 and 106, which transfer information at low speed. However, by carrying out image compression processing on the data to be outputted to the image output engine 108, the communication speed can be increased.

Moreover, the high-speed video transfer means 107 is comprised of the transmitting channel link means 601 provided in the protocol conversion box 104 and the receiving channel link means,603 provided in the image output engine 108. Besides, the transmitting channel link means 601 and the receiving channel link means 603 are connected via the high speed information transfer signal line 605 which transfers information at high speed. Moreover, the low speed information transfer signal line 604 and the high speed information transfer signal line 605, which connect between the protocol conversion box 104 and the image output engine 108, are accommodated in a single cable 602. As a result, the connection can be simplified and achieved at low cost.

Next, a description will now be given of a second embodiment of the present invention with reference to FIGS. 8A and 8B.

The basic construction of an information processing system including an information processing apparatus according to the second embodiment is substantially the same as that of the information processing system shown in FIG. 5 according to the first embodiment described above, and therefore the following description will be given with reference to FIG. 5 as well.

The present embodiment is different from the first embodiment in that RIPs 102 are installed in at least two of the server 101, the protocol conversion box 104, and the image output engine 108. However, in the present embodiment, even when RIPs 102 exist in at least two of the server 101, the protocol conversion box 104, and the image output engine 108, as described before with reference to the first embodiment, conversion control of the communication protocols is can be carried out by the communication protocol conversion section 105 in a manner corresponding to the places where the RIPs 102 exist.

In the following, a description will be given of a case where RIPs 102 are installed in the protocol conversion box 104 and the image output engine 108, a method of determining which of the RIPs 102 to use based on the performance (for example, processing speed) of the CPU (central processing unit) provided in each of the protocol conversion box 104 and the image output engine 108, and an operation of determining which of the RIPs 102 is inactive and changing a place where RIP processing is to be carried for each job according to results of the determination, to thereby improve the performance of the entire information processing system.

The protocol conversion box 104 used in the present embodiment can be connected to a wide variety of image output engines, which include a high speed image output engine having high functions, and a low speed image output engine having low functions.

Figure 8A:
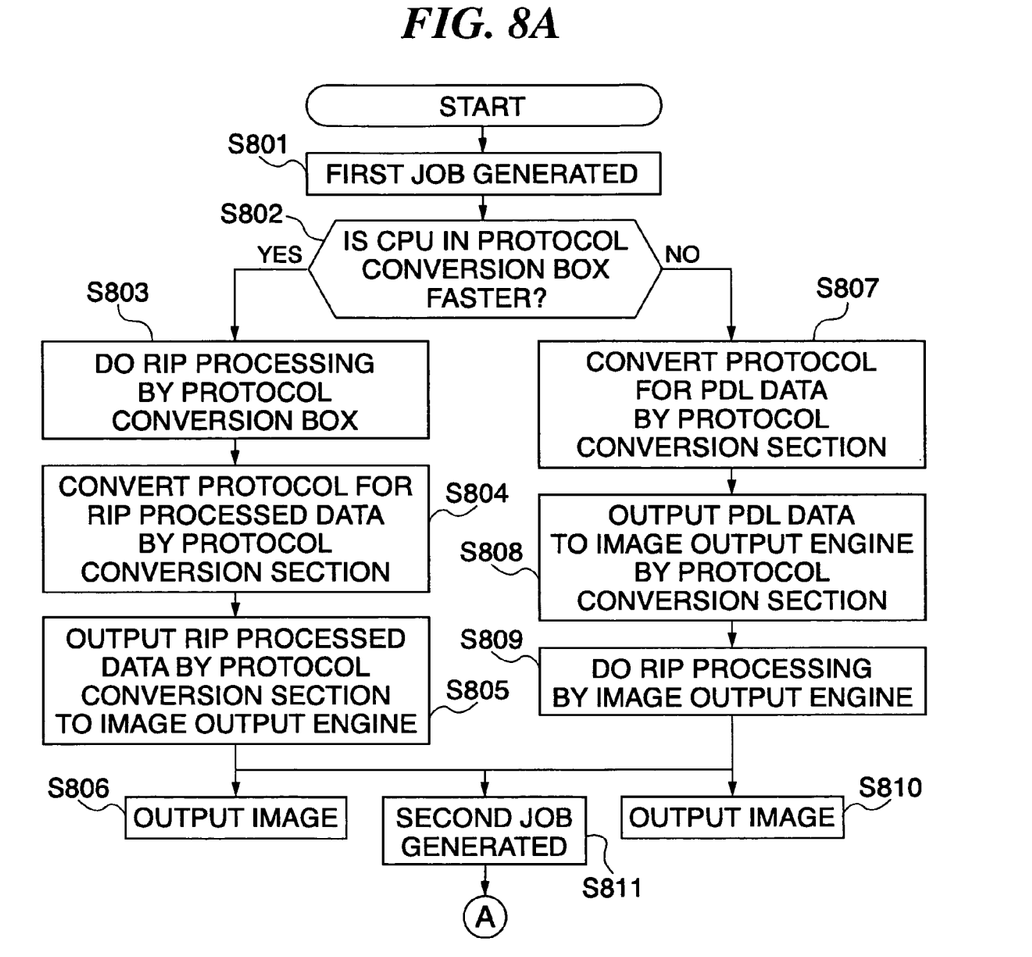
FIGS. 8A and 8B are flowchart showing a process carried out by an information processing system including an information processing apparatus according to a second embodiment of the present invention.
Figure 8B:
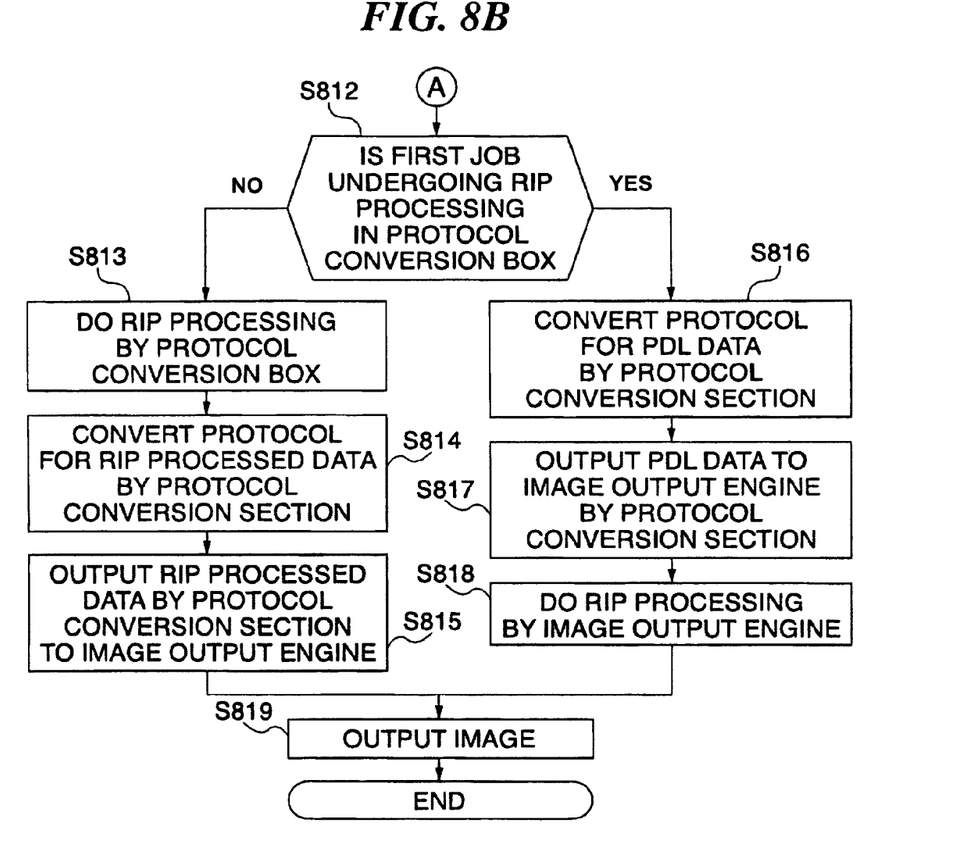

FIGS. 8A and 8B are flowchart showing a flow of a process carried out by the information processing system including the information processing apparatus according to the present embodiment.

First, in a step S801, a first job (first set of print commands) is generated from the server 101. Here, this job is PDL data. The server 101 sends the PDL data to the protocol conversion box 104 using the communication protocol A. Then, in a step S802, the protocol conversion box 104 makes a comparison of the performance between its own CPU and the CPU provided in the image output engine 108. This comparison may be carried out using a CPU performance comparison table stored in advance as data in a ROM (read only memory) or the like, or may be carried out by causing each of the protocol conversion box 104 and the image output engine 108 to execute a comparison program which can measure the processing speed of a simple job, and comparing the performances by comparing the execution speeds of the protocol conversion box 104 and the image output engine 108.

In the step S802, if the performance of the CPU of the protocol conversion box 104 is better than that of the CPU of the image output engine 108 (the processing speed is higher), that is, if the answer to the question of the step S802 is yes, the process proceeds to a step S803 where the communication protocol conversion section 105 sends an instruction to carry out RIP processing on the PDL data by the protocol conversion box 104 to the same. According to the instruction from the communication protocol conversion section 105, RIP processing is carried out on the PDL data by the RIP 102 in the protocol conversion box 104.

Then, in a step S804, the communication protocol conversion section 105 converts the communication protocol for the RIP-processed data acquired using the communication protocol A from the communication protocol A to the communication protocol B. In the next step S805, the RIP-processed data is outputted to the image output engine 108 using the communication protocol B. Then, in a step S806, the image output engine 108 receives the RIP-processed data, that is, bitmap image data, and outputs an image.

On the other hand, in the step S802, if the performance of the CPU of the protocol conversion box 104 is worse than that of the CPU of the image output engine 108 (the processing speed is lower), that is, if the answer to the question of the step S802 is no, the process proceeds to a step S807 where the communication protocol conversion section 105 converts the communication protocol for the PDL data from the communication protocol A to the communication protocol B. In the next step S808, the PDL data is outputted to the image output engine 108 using the communication protocol B. Then, in a step S809, the image output engine 108 receives the PDL data, and RIP processing is carried out on the PDL data by the RIP 102. Then, in a step S810, an image is outputted.

According to the above process, whenever the protocol conversion box 104 is connected to any of a wide variety of image output engines, the protocol conversion box 105 determines which RIP is to be used by default. In this sense, the communication protocol conversion section 105 has a function as a determining means for determining which RIP is to be used.

Then, in a step S811, a second job (second set of printing commands) is generated from the server 101. Then, in a step S812, the communication protocol conversion section 105 determines whether or not RIP processing is being carried out on the PDL data of the first job by the protocol conversion box 104. If it is determined that RIP processing is not being carried out on the PDL data of the first job by the protocol conversion box 104 (NO), the process proceeds to a step S813 where the communication protocol conversion section 105 sends an instruction to carry out RIP processing on the PDL data by the protocol conversion box 104, to the protocol conversion box 104. RIP processing is carried out on the PDL data of the second job in the protocol conversion box 104 by the RIP 102.

Then, in a step S814, the communication protocol conversion section 105 converts the communication protocol for the RIP-processed data from the communication protocol A to the communication protocol B. In the next step S8.15, the RIP processed data, that is, bitmap image data is outputted to the image output engine 108 using the communication protocol B. Then, in a step S819, the image output engine 108 receives that bitmap image data and then an image is outputted, followed by the process being terminated.

On the other hand, if in the step S812, it is determined that RIP processing is being carried out on the PDL data by the protocol conversion box 104 (YES), the process proceeds to a step S816 and the communication protocol conversion section 105 converts the communication protocol for the PDL data from the communication protocol A to the communication protocol B. In the next step S817, the PDL data of the second job is outputted to the image output engine 108. Then, in a step S818, the image output engine 108 receives the PDL data of the second job and RIP processing is carried out on the PDL data of the second job by the RIP 102. Then, in a step S819, an image is outputted, followed by the process being terminated.

The timing of image output operation (step S806 and step S810) and the timing of the operation of generating the second job (step S811) may overlap.

As described above, according to the present embodiment, the communication protocol conversion section 105 can carry out conversion control of the communication protocol according to the places where the RIPs 102 exist. A comparison between the processing speeds of the CPUs of the apparatuses in which the RIPs 102 exist is carried out and the RIP existing in the apparatus having the CPU with the higher processing speed is selected by default as the RIP to be used. Moreover, the operative states of a plurality of RIPs are checked to search for an inactive RIP, so that the RIP processing place is changed for each job, and a RIP is selected to be used by default, whereby the performance of the information processing system can be improved.

Next, a third embodiment of the present invention will be described with reference to FIG. 9.

Figure 9:
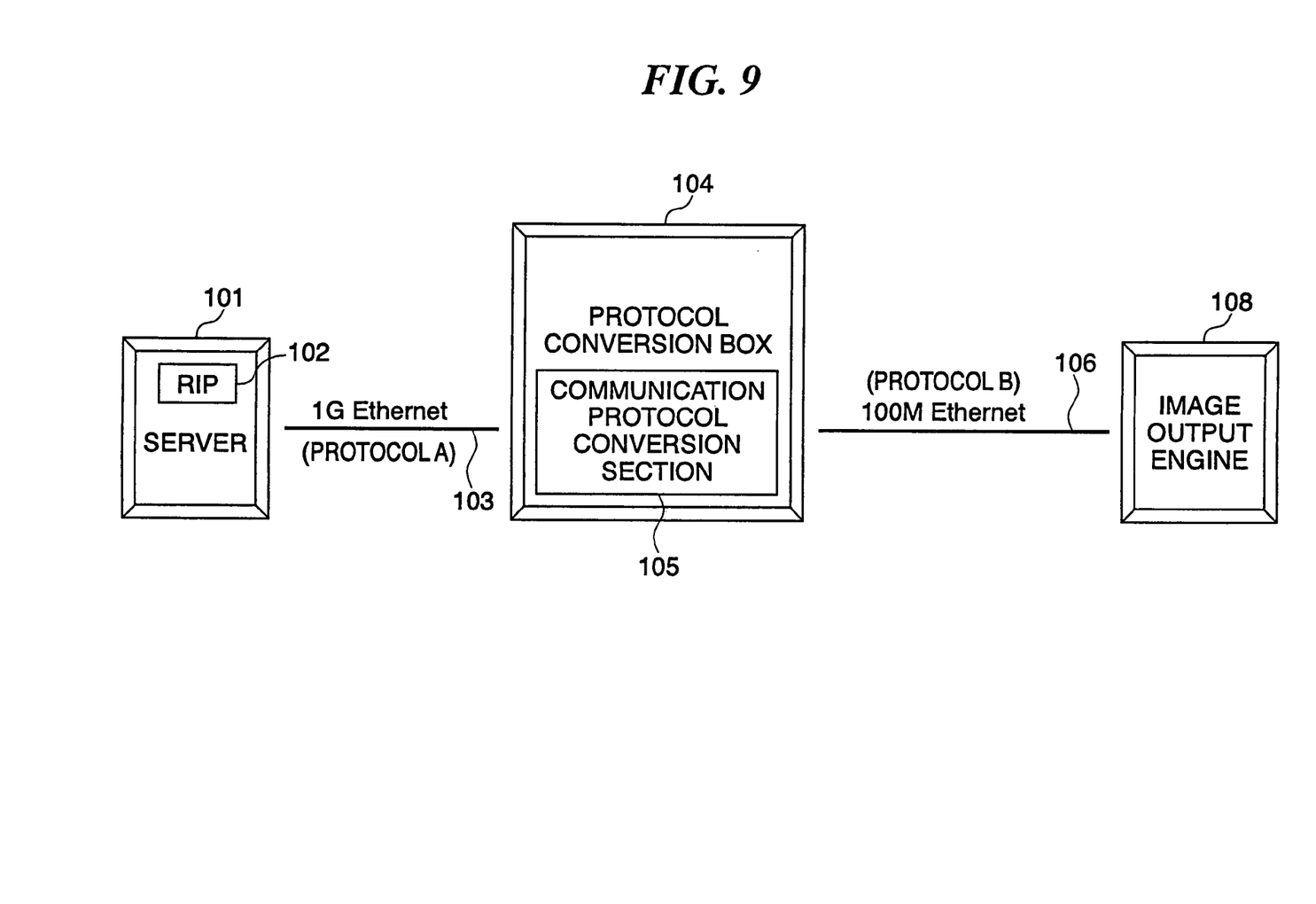
FIG. 9 is a diagram showing the arrangement of an information processing system including an information processing apparatus according to a third embodiment of the present invention.

FIG. 9 is a diagram showing the arrangement of an image processing system including an information processing apparatus according to the present embodiment. In the diagram, elements and part corresponding to those in FIG. 1 of the first embodiment described above are designated by like reference numerals.

The arrangement of FIG. 9 differs from that of FIG. 1 in that the high-speed video transfer means 107 has been removed from the arrangement of FIG. 1.

While the arrangement of the first embodiment makes it a prerequisite condition that data that has been RIP processed is outputted to the image output engine as raw data (that is, uncompressed data), which requires the use of the high-speed video transfer means 107, in the present embodiment, the image output engine 108 has a function for efficiently processing compressed data, which can dispense with the use of the high-speed video transfer means 107.

In FIG. 9, a print job is converted to bitmap image data by a RIP 102 provided in a server. However, an Ethernet 106, which is a 100M Ethernet, has an insufficient transfer speed for the image transfer of raw data. Therefore, the bitmap image data converted by the RIP 102 is subjected to JPEG compression or the like by the server, and then the compressed image data is transferred to the protocol conversion box 104 via the 1G Ethernet 103. Upon receiving the compressed image data from the server 101 via the 1G Ethernet 103, the protocol conversion box 104 converts the compressed data into an image format appropriate for the image output engine 108, and transfers the converted data to the image output engine 108 via the 100M Ethernet 106 (if the image format appropriate for the image output engine 108 is JPEG, the protocol conversion box 104 transfers the received image data as it is to the image output engine 108 via the 100M Ethernet 106.).

With this processing, even in an arrangement where the server 101 is connected to the image output engine 108 via the 1G Ethernet 103 or the 100M Ethernet 106, which is not a high speed I/F (interface), it possible to follow up to some degree the output (printing) processing speed of the image output engine 108.

Although in the present embodiment, the server 101 and the protocol transformation box 104 are connected via the 1G Ethernet 103 and the protocol transformation box 104 and the image output engine 108 are connected via the 100M Ethernet, this connection via the Ethernet is only an example, but any other connection means may be used.

As described above, according to the present invention, in the case where the image output engine 108 can smoothly process compressed image data, image transfer is possible without the use of a high-speed video transfer means. Therefore, a simplified system configuration can be realized.

It is to be understood that the object of the present invention may also be accomplished by supplying a system or an apparatus with a storage medium (or a recording medium) in which a program code of software, which realizes the functions of any of the above described embodiments is stored, and causing a computer (or CPU or MPU) of the system or apparatus to read out and execute the program code stored in the storage medium.

In this case, the program code itself read from the storage medium realizes the functions of any of the above described embodiments, and hence the program code and a storage medium on which the program code is stored constitute the present invention.

Further, it is to be understood that the functions of any of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of any of the above described embodiments may be accomplished by writing the program code read out from the storage medium into a memory provided in an expansion board inserted into a computer or a memory provided in an expansion unit connected to the computer and then causing a CPU or the like provided in the expansion board or the expansion unit to perform a part or all of the actual operations based on instructions of the program code.

Further, the above program has only to realize the functions of any of the above-mentioned embodiments on a computer, and the form of the program may be an object code, a program executed by an interpreter, or script data supplied to an OS.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program is supplied by downloading from another computer, a database, or the like, not shown, connected to the Internet, a commercial network, a local area network, or the like.

CROSS REFERENCE TO RELATED APPLICATION

This application claims priority from Japanese Patent Application No. 2003-353738 filed Oct. 14, 2003, which is hereby incorporated by reference herein.

What is claimed is:

1. An information processing apparatus communicable with an external information processing apparatus and an image forming apparatus via a predetermined communication medium, comprising:

an acquisition device that acquires a first print job and a second print job after acquiring the first print job from the external information processing apparatus, using a first communication protocol;

an image processing device that generates first raster image data of the first print job and generates second raster image data of the second print job acquired by said acquisition device;

a converting device that converts the first communication protocol to a second communication protocol that is different from the first communication protocol;

a transfer device that transfers the first print job or the first raster image data, and the second print job or the second raster image to the image forming apparatus, using the second communication protocol;

a determining device that determines whether or not said image processing device is generating the first raster image data of the first print job when said acquisition device acquires the second print job; and a controller that controls said image processing device to generate the second raster image data of the second print job when said determining device determines that said image processing device is not generating the first raster image data of the first print job, and controls said transfer device to transfer, using the second communication protocol, the second print job to the image forming apparatus when said determining device determines that said image processing device is generating the first raster image data of the first print job.

2. An information processing apparatus as claimed in claim 1, wherein:

the image forming apparatus has a first central control device that controls an image processing function thereof;

the information processing apparatus further comprises a second central control device that controls functioning of said image processing device, and a determining device that determines whether to carry out the first and second print jobs by the image forming apparatus or said image processing device, according to a difference between performances of said first central control device and said second control device.

3. An information processing apparatus as claimed in claim 1, wherein:

said acquisition device has a first network interface that acquires the first and second print jobs from the external information processing apparatus; and said transfer device has a second network interface and a high speed video interface that transfer the first and second print jobs or the first and second raster image data to the image forming apparatus.

4. A control method of controlling an information processing apparatus communicable with an external information processing apparatus and an image forming apparatus via a predetermined communication medium, comprising:

an acquisition step of acquiring a first print job and a second print job after acquiring the first print job from the external information processing apparatus, using a first communication protocol;

an image processing step of generating first raster image data based of the first print job and generates second raster image data of the second print job acquired in said acquisition step;

a converting step of converting the first communication protocol to a second communication protocol that is different from the first communication protocol;

a transfer step of transferring the first print job or the first raster image data, and the second print job or the second raster image to the image forming apparatus, using the second communication protocol;

a determining step of determining whether or not said image processing step is generating the first raster image data of the first print job when said acquisition step acquires the second print job; and a control step of controlling said image processing step to generate the second raster image of the second print job when said determining step determines that said image processing step is not generating the first raster image data of the first print job, and controlling said transfer step to transfer, using the second communication protocol, the second print job to the image forming apparatus when said determining step determines that said image processing step generating the first raster image data of the first print job.

5. A control method as claimed in claim 4, wherein:

the image forming apparatus has a first central control device that controls an image processing function thereof;

the information processing apparatus comprises a second central control device that controls functioning of said image processing step;

the control method further comprises a determining step of determining whether to carry out the first and second print jobs by the image forming apparatus or in said image processing step, according to a difference between performances of the first central control device and the second control device.

6. A control method as claimed in claim 4, wherein:

said acquisition step acquires the first and second print jobs from the external information processing apparatus, using a first network interface; and said transfer step transfers the first and second print jobs or the first and second raster image data to the image forming apparatus, using a second network interface or a high speed video interface.

7. A computer-readable medium storing a computer program executable by an information processing apparatus communicable with an external information processing apparatus and an image forming apparatus via a predetermined communication medium, the computer program comprising:

an acquisition module for acquiring a first print job and a second print job from the external information processing apparatus, using a first communication protocol;

an image processing module for generating first raster image data of the first and generating second raster image data of the second print job acquired by said acquisition module;

a converting module for converting the first communication protocol to a second communication protocol that is different from the first communication protocol;

a transfer module for transferring the first print job or the first raster image data, and the second print job or the second raster image to the image forming apparatus, using the second communication protocol;

a determining module for determining whether or not said image processing module is generating the first raster image data of the first print job when said acquisition module acquires the second print job; and a control module for controlling said image processing module to generate the second raster image data of the second print job when said determining module determines that said image processing module is not generating the first raster image data of the first print job, and controlling said transfer module to transfer, using the second communication protocol, the second print job to the image forming apparatus when said determining module determines that said image processing module is generating the first raster image data of the first print job.

* * * * *